United States Patent Office 3,336,312
Patented Aug. 15, 1967

3,336,312
LINEAR-TRANS-6-HYDROXY-QUINACRIDONES
Willy Braun, Heidelberg, and Rolf Mecke, Ludwigshafen (Rhine), Germany, assignors to Badische Anilin- & Soda-Fabrik Aktiengesellschaft, Ludwigshafen (Rhine), Germany
No Drawing. Filed July 9, 1964, Ser. No. 381,572
Claims priority, application Germany, Oct. 22, 1960, B 59,826; Nov. 22, 1963, B 74,355; Great Britain, July 18, 1963, 49,695/63
14 Claims. (Cl. 260—279)

This application is a continuation-in-part of the application of Willy Braun, Wilhelm Ruppel, and Rolf Mecke, Ser. No. 100,496, filed Apr. 4, 1961, now Patent No. 3,147,263.

This invention relates to 6-hydroxy-7,14-dioxo-5,7,12,14-tetrahydroquinolino-[2,3-b]-acridines (linear-trans-6-hydroxyquinacridones), particularly those having the general formula:

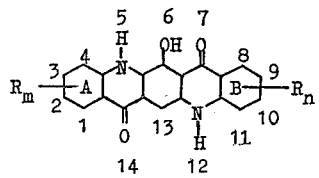

In this formula $m$ and $n$ denote whole numbers from 1 to 4, R may denote hydrogen, halogen, such as fluorine, chlorine, bromine or iodine, a lower alkyl group having one to four carbon atoms, a lower alkoxyl group, such as methoxyl or ethoxyl, a phenyl radical, which may also be substituted, a nitro group, a radical $NH_2$, $NHR'$ or $NR'_2$ in which $R'$ denotes a lower alkyl radical or acyl radical, or a sulfonamide group. R together with the rings A and B may also form an aromatic ring system, such as the ring system of naphthalene, or a heterocyclic ring system, such as the ring system of carbazole, diphenylene oxide or diphenylene sulfide. If in the positions 1–4 and 8–11 of the formula given above more than one R is different from hydrogen, the substituents may be identical or different. For reasons of availability in industry those compounds are preferred for pigment dyes which in the positions 1–4 and 8–11 bear no less than a total of 4 hydrogen atoms.

The new compounds can be obtained by reduction of linear-trans-quinacridonequinones by means of copper or copper alloys in a mineral acid medium.

At about 60% to about 100% sulfuric acid or polyphosphoric acid may for example be used as the mineral acid medium. The copper, which may be used in admixture with other metal, and the copper alloys, for example brass, is preferably used in finely divided form, for example as powder or chips. The reduction temperature may be in the range between about 10° and 150° C. It is not necessary for the linear-trans-quinacridonequinones to be dissolved in the reduction medium. In all cases it is recommended that the finely divided metal and, if necessary, the quinacridonequinone should be kept in suspension by stirring or similar mechanical means.

A part of the invention herein claimed pertains to the discovery initially described in the aforesaid application that a new compound with very good pigment properties is obtained in very good yields if copper powder is allowed to act, at temperatures of above 100° C., on a solution of quinacridonequinone in concentrated sulfuric acid, e.g., having a concentration of more than 70% up to about 85%. We have discovered that the new compound above-described is linear-trans-6-hydroxyquinacridone.

The linear-trans-quinacridonequinones required as initial compounds for the reduction may be obtained by the process described in German patent specification No. 1,140,300. It is not necessary however that the quinacridonequinones should be present in isolated form for the reduction. For example quinacridonequinones prepared by heating 2,5-dianthranilobenzoquinones in sulfuric acid or in polyphosphoric acid may be reduced direct in the condensation melt to the linear-trans-6-hydroxyquinacridones.

Examples of new compounds which are obtained by reduction of linear-trans-quinacridonequinones are dialkyl-6-hydroxy-linear-trans-quinacridone, dialkoxy-6-hydroxy-linear-trans-quinacridone, diamino-6-hydroxy-linear-trans-quinacridone, dihalogen-6-hydroxy-linear-trans-quinacridone, tetrahalogen-6-hydroxy-linear-trans-quinacridone. Specific compounds are, for example, 2,9-dimethyl-6-hydroxy-linear-trans-quinacridone, 4,11-dimethoxy-6-hydroxy-linear-trans-quinacridone, 2,9-dichloro-6-hydroxy-linear-trans-quinacridone, 2,9-dibromo-6-hydroxy-linear-trans-quinacridone and 2,4,9,11-tetrachloro-6-hydroxy-linear-trans-quinacridone. Examples of other compounds to which the present invention relates are: 2,9-difluoro-6-hydroxy-linear-trans-quinacridone, 4,11-difluoro-6-hydroxy-linear-trans-quinacridone, 2,9-diamino-6-hydroxy-linear-trans-quinacridone, 2,9-diacetamino-6-hydroxy-linear-trans-quinacridone, 1,8-dichloro-6-hydroxy-linear-trans-quinacridone, 1,8-dimethyl-6-hydroxy-linear-trans-quinacridone, 1,8-dimethoxy-6-hydroxy-linear-trans-quinacridone, 1,8-dibromo-3,10-dichloro-6-hydroxy-linear-trans-quinacridone, 1,3,8,10-tetrabromo-6-hydroxy-linear-trans-quinacridone and the compound having the formula

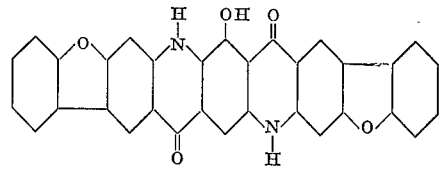

Other suitable anellated rings are the benzo or the naphtho ring or heterocyclic rings with a total of 5 or 6 ring members.

The new compounds are valuable red to violet dyes. They are particularly suitable as pigment dyes for coloring synthetic materials and lacquers, and also for paints and printing pastes. Some of the compounds may be used for dyeing synthetic fibers.

The invention is further illustrated by the following examples. Parts are by weight.

Example 1

10.2 parts of copper powder is introduced into a suspension of 27.4 parts of linear-trans-quinacridonequinone in 280 parts of 70% sulfuric acid. The whole is heated for two to three hours at 130° C., allowed to cool and the deposited red violet crystals are suction filtered. The excess copper is dissolved out with dilute hydrochloric acid and 20 parts of red violet crystals are obtained (crude product). 19 parts of this crude product is dissolved in 190 parts of 96% sulfuric acid, a small amount of insoluble matter is filtered off, and 55 parts of water is added to the filtrate. The whole is cooled, the deposited crystals are suction filtered and washed with water until neutral. 15 parts of red-violet crystals of linear-trans-6-hydroxyquinacridone are obtained ($C_{20}H_{12}N_2O_3$; 328).

Example 2

25 parts of linear-trans-quinacridonequinone is dissolved in 250 parts of 80% sulfuric acid at 120° C. 15 parts of copper powder is added during the course of fifteen minutes and the whole is stirred for two hours at 120° to 125° C. The whole is cooled to about 50° C., excess copper is filtered off and water is added to the filtrate until crystallization begins. The deposited crystals are suction filtered and taken up in hot water. By recrystallization and washing with water until neutral, 20 parts of 6-hydroxy-linear-trans-quinacridone is obtained in the form of violet crystals.

*Example 3*

25 parts of linear-trans-quinacridonequinone is dissolved in 250 parts of 96% sulfuric acid. 15 parts of copper powder is added to the clear solution at 25° C. and the whole is stirred for three hours at 35° to 45° C. 21 parts of 6-hydroxy-linear-trans-quinacridone is obtained by working up as described in Example 2.

*Example 4*

50 parts of 2,5-di(o-carboxyanilino-1,4-benzoquinone is heated for an hour at 120° C. in 500 parts of 96% sulfuric acid. The whole is then cooled to 30° C., 33 parts of copper powder is added and the whole stirred for three hours at 35° to 45° C. The product is worked up as in Example 2 and 36 parts of 6-hydroxy-linear-trans-quinacridone is obtained.

*Example 5*

20 parts of linear-trans-quinacridonequinone is dissolved in 400 parts of polyphosphoric acid having a $P_2O_5$-content of about 55 to 60% at 120° C. 12 parts of copper powder is added and the whole is stirred for one hour at 120° to 130° C. It is then poured onto ice, filtered and the residue boiled for removal of copper with dilute hydrochloric acid. The whole is filtered and the product washed. 14.5 parts of 6-hydroxy-linear-trans-quinacridone is obtained as a violet crystal powder which can be further purified by fractionation from concentrated sulfuric acid with water.

*Example 6*

30 parts of linear-trans-quinacridonequinone is dissolved in 450 parts of 72% sulfuric acid at 130° C. and 25 parts of brass chips is added. The whole is stirred for two hours at 130° C. and poured onto ice. The precipitate is filtered off, washed and dried. It is then dissolved in 450 parts of concentrated sulfuric acid and water is added until crystallization occurs. The product is suction filtered, washed with hot water until neutral and dried. 23 parts of 6-hydroxy-linear-trans-quinacridone is obtained.

*Example 7*

20 parts of copper powder is added to 25 parts of 2,9-dimethyl-linear-trans-quinacridonequinone in 250 parts of 75% sulfuric acid at 120° C. The whole is stirred for two hours at 120° to 130° C., allowed to cool and the product filtered off by suction. The product is worked up and if necessary purified as described in Example 9. 19 parts of 2,9-dimethyl-6-hydroxyquinacridone is obtained in the form of violet crystals.

*Example 8*

30 parts of 4,11-dimethoxyquinacridonequinone is dissolved in 450 parts of 70% sulfuric acid at 120° C. 25 parts of copper powder is added and the whole is stirred for one hour at 120° C. The whole is then cooled and worked up according to Example 9. 26 parts of 4,11-dimethoxy-6-hydroxy-linear-trans-quinacridone is obtained as red crystals. The product may be further purified by fractionation from sulfuric acid or by heating in high boiling organic solvents.

*Example 9*

30 parts of 2,9-dichloro-linear-trans-quinacridonequinone in 500 parts of 85% sulfuric acid at 130° C. has 20 parts of copper powder added to it and the mixture is stirred for two hours at 130° C. The whole is cooled, suction filtered and the residue boiled with 1000 parts of 5% hydrochloric acid, filtered and washed with water until neutral. 26 parts of 2,9-dichloro-6-hydroxy-linear-trans-quinacridone is obtained in the form of violet crystals. The product may be further purified by dissolution in sulfuric acid and fractionation with water.

*Example 10*

34 parts of 2,9-dibromo-linear-trans-quinacridonequinone is dissolved in 510 parts of 96% sulfuric acid. 28 parts of copper powder is added at 60° C. and the whole is stirred for one hour at 55° to 60° C. The mixture is then filtered off by suction and then 20 parts of water is added to the filtrate. The deposited crystals are suction filtered, taken up in hot water, filtered and washed. 22 parts of 2,9-dibromo-6-hydroxy-linear-trans-quinacridone is obtained in the form of violet crystals.

*Example 11*

18 parts of copper powder is added at 130° C. to 28 parts of 2,4,9,11-tetrachloro-linear-trans-quinacridonequinone in 560 parts of 85% sulfuric acid. The whole is stirred for three hours at 130° C. and then worked up as in Example 9. 25 parts of 2,4,9,11-tetrachloro-6-hydroxy-linear-trans-quinacridone is obtained in the form of violet crystals.

*Example 12*

25 parts of 1,8-dichloro-linear-trans-quinacridonequinone is dissolved in 250 parts of 96% sulfuric acid and to this solution 15 parts of copper powder is added at 60° C. The mixture is stirred at 60° C. for one hour and the filtrate is combined with water until crystallization begins. The precipitated crystals are filtered off by suction and suspended in hot water from which suspension, after filtration and washing neutral with water, 19 parts of 1,8-dichloro-6-hydroxyquinacridone is obtained as violet crystals.

When proceeding as described above, but using 1,8-dimethyl-quinacridonequinone, 1,8-dimethoxyquinacridonequinone, 1,8-dibromoquinacridonequinone, 3,10-dichloroquinacridonequinone or 3,10-dibromoquinacridonequinone instead of 1,8-dichloroquinacridonequinone, the analogously substituted 6-hyroxyquinacridones are obtained as violet crystals.

*Example 13*

30 parts of 2,5-di-(p-chloro-o-carboxyanilino)-1,4-benzoquinone is dissolved in 300 parts of 96% sulfuric acid, the solution is heated at 130° C. for one hour, cooled to 60° C. and then, after adding 20 parts of copper powder, stirred at 60° to 65° C. for one hour. After further processing the solution as described in Example 2, 22 parts of 2,9-dichloro-6-hydroxyquinacridone is obtained as violet crystals.

*Example 14*

15 parts of 2,9-diamino-linear-trans-quinacridonequinone is dissolved in 150 parts of 96% sulfuric acid and to this solution 10 parts of copper powder is added at 50° C. The mixture is stirred at 50° C. for one hour. After filtration by suction and fractionation from sulfuric acid solution (96% sulfuric acid) with water 8 parts of 2,9-diamino-6-hydroxyquinacridone is obtained as a blue-violet crystal powder.

*Example 15*

15 parts of the compound having the formula

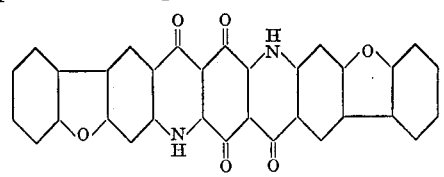

is dissolved in 200 parts of 85% sulfuric acid at 60° C. and to this solution 10 parts of copper powder is added. The mixture is stirred at 80° to 85° C. for one hour. After filtration by suction and fractionation with water 9 parts of violet crystals of the formula

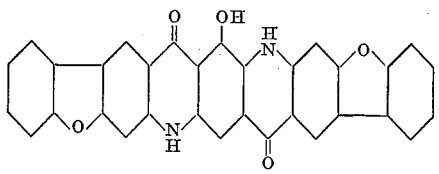

are obtained.

*Example 16*

(a) The 6-hydroxy-linear-trans-quinacridones prepared as described in Examples 1 to 15 are brought to a mean primary particle size of about 0.1–0.5μ in conventional manner, as for example by dissolution in and reprecipitation from sulfuric acid or by grinding with common salt in the presence or absence of solvents.

(b) 20 parts of the dye thus prepared is triturated with 60 parts of linseed oil in a three-roller mill in conventional manner. The printing ink thus prepared is suitable for multi-color printing giving brilliant prints with outstanding fastness properties, especially high light fastness, by book and offset printing methods.

*Example 17*

8 parts of the pigment dye prepared as described in Example 16(a) is triturated in a conical mill with a baking lacquer from 40 parts of coconut oil alkyd resin with 40% of coconut oil, 12 parts of urea-formaldehyde resin, 40 parts of xylene and 8 parts of n-butanol. The formulation thus obtained can be used for preparing lacquerings which have a high gloss and are outstandingly fast to weathering and overspraying after curing by baking.

*Example 18*

A mixture of 70 parts of polyvinyl chloride, 30 parts of diisooctylphthalate and 1 part of titanium dioxide of the rutile type is colored with 0.5 part of the pigment dye prepared as described in Example 16 (a) on mixing rolls at 100° C. in conventional manner. The plastic composition obtained has a bluish red coloration and can be used for the production, for example, of sheets and profiles. The coloration is distinguished by good fastness to light and plasticizers.

*Example 19*

1 part of granular polystyrene and 1 part of the pigment dye prepared as described in Example 16(a) are thoroughly mixed dry in a mixing drum. The mixture is treated in a screw homogenizer heated to 180° C. The strand emerging from the die is granulated and the granulate injection-molded. The moldings have a brilliant coloration and very good fastness to light.

*Example 20*

(a) A solution of 50 parts of 6-hydroxyquinacridone in 500 parts of 96% sulfuric acid is poured slowly into 3000 parts of water at 50° C. The precipitate formed is filtered off by suction, washed neutral and dried.

(b) 20 parts of the dye thus prepared is triturated with 60 parts of linseed oil in a three-roller mill. The printing ink obtained gives brilliant red-violet colorations of outstanding fastness to light by book and offset printing methods.

*Example 21*

Finely dispersed pigment dye obtained as described in Example 20(a) can be used in the manner described in Examples 16–20 for the coloring of making lacquers, polyvinyl chloride, polystyrene and similar materials giving very fast colorations.

We claim:

1. Linear-trans-6-hydroxy-quinacridones of the formula

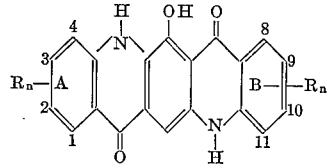

in which $n$ is a whole number from 1 to 2, R denotes a member selected from the group consisting of bromine, chlorine, lower straight chain alkyl having one to four carbon atoms, lower straight chain alkoxyl having one to four carbon atoms, a primary amino group, and an anellated ring system fused with ring A and ring B of the formula

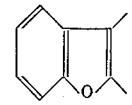

the substituents in ring A and B being arranged in para-position to one another, both R's being the same member in a given compound.

2. 2,9 - dimethyl - 6 - hydroxy - linear - trans - quinacridone.
3. 4,11 - dimethoxy - 6 - hydroxy - linear - trans - quinacridone.
4. 2,9 - dichloro - 6 - hydroxy - linear - trans - quinacridone.
5. 2,9 - dibromo - 6 - hydroxy - linear - trans - quinacridone.
6. 2,9 - diamino - 6 - hydroxy - linear - trans - quinacridone.
7. 1,8 - dimethyl - 6 - hydroxy - linear - trans - quinacridone.
8. 1,8 - dimethoxy - 6 - hydroxy - linear - trans - quinacridone.
9. The compound of the formula

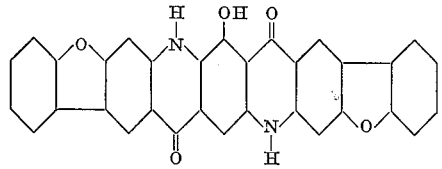

10. A process for producing linear-trans-6-hydroxyquinacridone which comprises reducing linear-trans-quinacridonequinone in concentrated sulfuric acid in the presence of finely-divided copper powder suspended in the sulfuric acid.

11. A process for producing linear-trans-6-hydroxyquinacridone which comprises reducing linear-trans-quinacridonequinone in concentrated sulfuric acid at above 100° C. in the presence of finely-divided copper suspended in said sulfuric acid.

12. Linear-trans-6-hydroxyquinacridone.

13. A process for producing linear-trans-6-hydroxyquinacridone with comprises reducing linear-trans-quinacridonequinone in polyphosphoric acid in the presence of finely-divided copper suspended in said polyphosphoric acid.

14. A process for producing linear-trans-6-hydroxyquinacridone which comprises reducing linear-trans-quinacridonequinone in about 96% sulfuric acid at about 35–45° C. in the presence of finely divided copper suspended in said sulfuric acid.

References Cited

UNITED STATES PATENTS 3,147,263   9/1964   Braun et al. _____ 260—279

OTHER REFERENCES

Braun (Belgium), 609, 423, Apr. 20, 1962 (abstracted in Chem. Abstracts 57, P13757e)(1962).

1,140,300, November 1962, German Auslegeschrift.

ALEX MAZEL, *Primary Examiner.*

NICHOLAS S. RIZZO, *Examiner.*

DONALD G. DAUS, *Assistant Examiner.*